Aug. 18, 1959 L. LEA 2,900,449
TELEPHONE CALL TRACING AND RECORDING SYSTEM
Filed Sept. 9, 1957
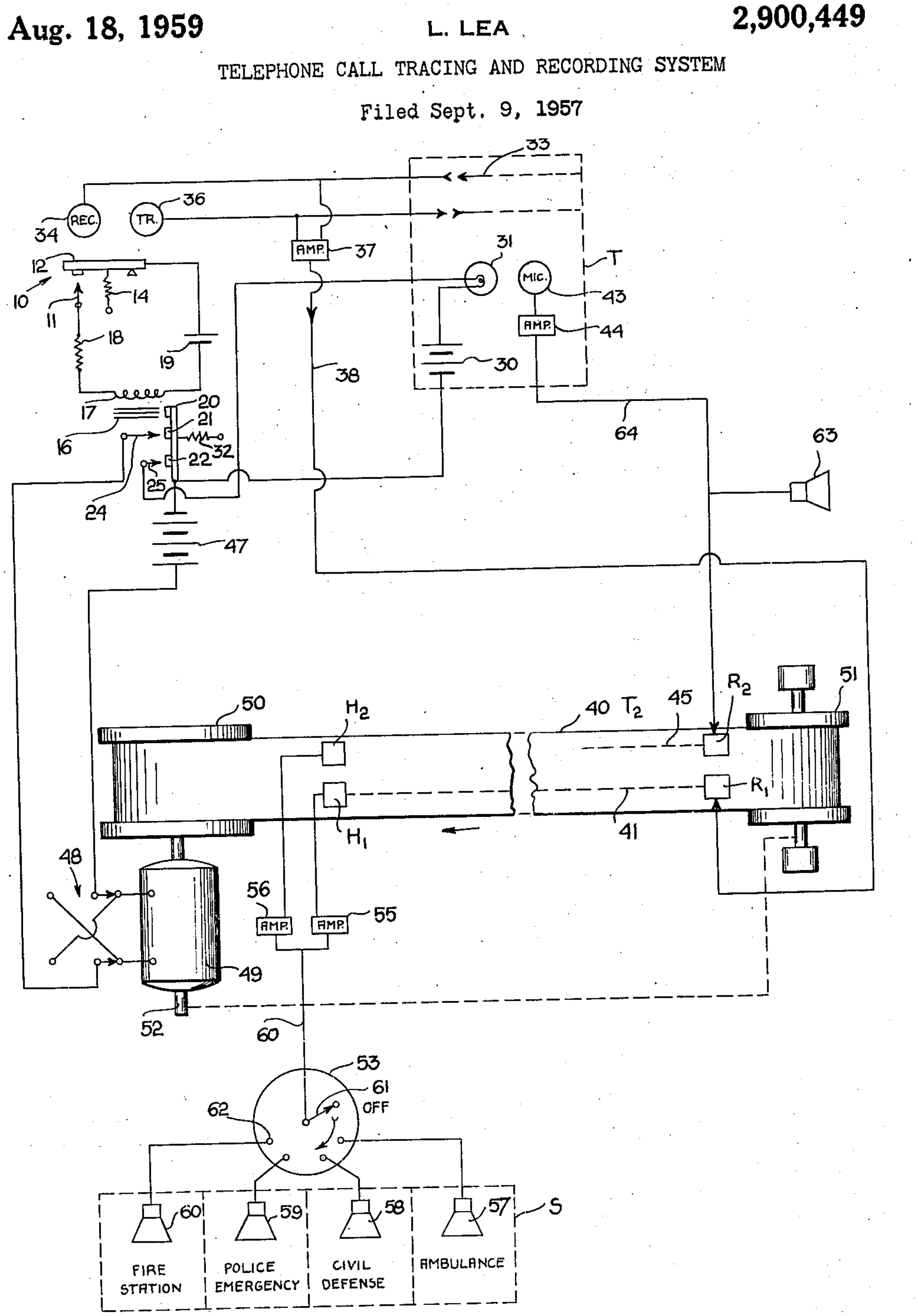
INVENTOR.
LAWRENCE LEA
BY [signature]
ATTORNEY United States Patent Office 2,900,449
Patented Aug. 18, 1959

2,900,449

TELEPHONE CALL TRACING AND RECORDING SYSTEM

Lawrence Lea, Bronx, N.Y.

Application September 9, 1957, Serial No. 682,865

7 Claims. (Cl. 179—6)

This invention concerns a telephone call tracing and recording system.

Heretofore, telephone calls have frequently been received at police stations, hospitals, and other emergency points from calls who were apparently in a distressed condition. It has often been desirable to trace the source of the telephone call as soon as possible, preferably while the caller was still speaking, to learn the address from which the call emanated. The need has also existed to relay this information about the source of the call together with the subject matter of the call to some emergency relief station such as a fire station, civil defense, ambulance, or other public service installation, so that prompt remedial steps could be initiated even while the caller was still in contact with the original station called. As an example, persons contemplating suicide or other drastic or criminal act, have frequently called a police station. There the police officer has attempted to hold the caller on the telephone line long enough to allow the call to be traced. Generally, too long a period of time elapses and an emergency service cannot be contacted soon enough to prevent commission of the threatened act.

According to the invention, and as a principal object thereof, there is provided a system wherein a call is automatically recorded at a receiving station, as soon as the call comes in a signal is sent to a telephone central station to trace the source of the call. The central operator's report is automatically recorded at the receiving station along with the original call. With the recording of the original call and operator's report there is transmitted to a selected emergency station, a reproduction of the recorded call and the operator's report so that the emergency service is alerted and put into action even before the original call is completed.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

The single figure of the drawing illustrates diagrammatically the arrangement of apparatus at a receiving station, as well as the essential components at the telephone central operator's station and at the emergency service stations.

Referring to the drawing, there is shown a switch 10 having a fixed contact 11 and movable contact 12 biased to an open position by spring 14. This switch may be a push button type arranged to be manually operated by the recipient of an emergency call to be handled at the receiving station or the switch could be installed in the conventional telephone receiver-transmitter box to be automatically closed when the telephone receiver is lifted from the box to answer the incoming emergency call. A relay 16 has its coil 17 in series with switch 10, resistor 18 and battery 19. The relay has a movable armature 20 which causes movable contacts 21 and 22 to close with fixed contacts 24 and 25 when the relay is energized.

A battery 30 is in series with contacts 22 and lamp 31 located at telephone central station T. Armature 20 is normally retracted by spring 32. When the relay 16 is energized, lamp 31 lights to provide a signal to the central telephone operator to trace the call originating on line 33. The call on line 33 is received at the telephone receiver 34 by a police-officer or other person in attendance to receive calls for which the telephone may be connected through a switch or connected permanently for tracing the origin and for recording the time and date of incoming calls. The attendant speaks to the caller via transmitter 36 of the telephone. Both the incoming and outgoing audio signals are amplified by amplifier 37 and transmitted via line 38 to recording head $R_1$. Recording head $R_1$ records magnetically on dual track magnetic tape 40. On track 41 is recorded the entire contents of the incoming emergency call or other calls which may require tracing and recording. The alerted operator at the central station T announces vocally the listed name, address and telephone number, etc., of the telephone where the call originates, and the time of the call. This announcement is made at microphone 43 which converts the audible signals to electrical pulses and transmits them via amplifier 44 to recorder head $R_2$. This report of the operator is recorded magnetically on track 45. The report may be repeated several times to insure its accurate recording.

When the relay 16 is energized, contacts 21 and 24 close. These contacts are in series with battery 47, a reversing switch 48, and a motor 49. The motor drives the tape 40 which is mounted on reels or spools 50 and 51. The attendant can reverse the direction of drive of the tape since both spools are driven by shaft 52 of the motor, and can repeat.

Reproducer heads $H_1$ and $H_2$ are spaced from recorder heads $R_1$ and $R_2$ and transmit simultaneously to amplifiers 55 and 56, respectively, the recorded call and the operator's report. The attendant has a selector switch 53 for selecting which of the loud-speakers 57–60 in the several remote emergency service stations S shall be connected to the amplifiers 55 and 56. The electrical connection is made via line 60, rotary contact 61 and fixed contacts 62 in the switch 53.

A monitor loud-speaker 63 is connected to line 64 between recorder head $R_2$ and amplifier 44 so that the attendant at the receiver station can hear the central operator's report while the conversation is going on with the caller being traced.

It will be noted that the attendant can determine, for example, that the call concerns a fire and connects amplifier 55 to the loud-speaker 60 at the fire station. An attendant at the fire station will then hear the entire contents of the call and superimposed on it will be telephone central operator's report. The amplifier 56 may be adjusted to deliver a signal of higher amplitude than the signal from amplifier 55 so that there will be no mistaking the reported name and address reported by the central operator. The report will be short and made at spaced intervals so that the contents of the incoming call are not materially interfered with.

Thus, the emergency service S selected can at once go into action even while the call being reproduced at the emergency station is being received. If desired, the receiver station attendant can then turn switch 53 to alert another emergency station. Of course any two or more emergency service stations can be connected in parallel by suitable switches to receive the reproduced call simultaneously. By reversing the motor the attendant can re-run the tape 40 past head $H_1$ and $H_2$ to repeat transmission of the call to emergency stations S.

It is to be understood that this type of call tracing and recording system may be installed to function with telephones of all types, located at various governmental agencies, institutions, brokerage houses and other business firms, where it is desirable to maintain a permanent record of incoming calls.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. An emergency call tracing and reproducing system, comprising a receiver station, a telephone central station, an emergency service station, said receiver station having a telephone receiver connected to said central station via a telephone line, a dual track tape recording and reproducing device located at the receiver station, one of said tracks having a recorder head connected with said telephone receiver to record a call received by said telephone receiver, a signal means located at the central station and operatively connected to the receiver station to be lit when said call is received at the receiver station, a microphone at the central station connected via a first amplifier and another telephone line to another recorder head for recording a message on the other of the dual tracks, a pair of reproducing heads spaced longitudinally along the tape from the recorder heads to pick up signals from the tracks respectively and transmit them to a pair of amplifiers, and a loud-speaker located at said emergency service station and connected in circuit with said pair of amplifiers.

2. An emergency call tracing and reproducing system, comprising a receiver station, a telephone central station, said receiver station having a telephone receiver connected to said central station via a telephone line, a dual track tape recording and reproducing device located at the receiver station, one of said tracks having a recorder head connected with said telephone receiver to record a call received by said telephone receiver, a signal lamp located at the central station and operatively connected to the receiver station to be lit when said call is received at the receiver station, a microphone at the central station connected via a first amplifier and another telephone line to another recorder head for recording a message on the other of the dual tracks, and a pair of reproducing heads spaced longitudinally along the tape from the recorder heads to pick up signals from the tracks respectively and transmit them to a pair of amplifiers for transmission to a loud-speaker located at an emergency service station.

3. An emergency call tracing and reproducing system, comprising a receiver station, a telephone central station, an emergency service station, said receiver station having a telephone receiver connected to said central station via a telephone line, a dual track tape recording and reproducing device located at the receiver station, one of said tracks having a recorder head connected with said telephone receiver to record a call received by said telephone receiver, a signal lamp located at the central station and operatively connected to the receiver station to be lit when said call is received at the receiver station, a microphone at the central station connected via a first amplifier and another telephone line to another recorder head for recording a message on the other of the dual tracks, a pair of reproducing heads spaced longitudinally along the tape from the recorder heads to pick up signals from the tracks respectively and transmit them to a pair of amplifiers, and a loud-speaker located at said emergency service station and connected in circuit with said pair of amplifiers.

4. An emergency call tracing and reproducing system, comprising a receiver station, a telephone central station, said receiver station having a telephone receiver connected to said central station via a telephone line, a tape recording and reproducing device located at the receiver station, said device having a recorder head connected with said telephone receiver to record a call received by said telephone receiver, a signal lamp located at the central station and operatively connected to the receiver station to be lit when said call is received at the receiver station, a microphone at the central station connected via a first amplifier and another telephone line to another recorder head for recording a message on the tape, and a pair of reproducing heads spaced longitudinally along the tape from the recorder heads to pick up signals from the tracks respectively and transmit them to amplifier means connected to said pair of reproducing heads.

5. An emergency call tracing and reproducing system, comprising a receiver station, a telephone central station, a plurality of emergency service stations, said receiver station having a telephone receiver connected to said central station via a telephone line, a dual track tape recording and reproducing device located at the receiver station, one of said tracks having a recorder head connected with said telephone receiver to record in full a call received by said telephone receiver, a signal lamp located at the central station and operatively connected to the receiver station to be lit when said call is received at the receiver station, a microphone at the central station connected via a first amplifier and another telephone line to another recorder head for recording a message on the other of the dual tracks, a pair of reproducing heads spaced longitudinally along the tape from the recorder heads to pick up signals from the tracks respectively and transmit them to a pair of amplifiers, a selector switch connected to each of said pair of amplifiers, and a plurality of loud-speakers located at said plurality of emergency service stations respectively, said selector switch being connected to said emergency service stations to select the particular emergency station to receive said recorded call and message via said pair of amplifiers, and a monitor loud-speaker connected to said first amplifier at the receiver station.

6. An emergency call tracing and reproducing system, comprising a receiver station, a telephone central station, a plurality of emergency service stations, said receiver station having a telephone receiver connected to said central station via a telephone line, a dual track tape recording and reproducing device located at the receiver station, one of said tracks having a recorder head connected with said telephone receiver to record in full on said one track a call received by said telephone receiver, a signal lamp located at the central station and operatively connected to the receiver station to be lit when said call is received at the receiver station, a microphone at the central station connected via a first amplifier and another telephone line to another recorder head for recording a message on the other of the dual tracks, a pair of reproducing heads spaced longitudinally along the tape from the recorder heads to pick up signals from the tracks respectively and transmit them to a pair of amplifiers, a selector switch connected to each of the amplifiers, a plurality of loud-speakers located at said plurality of emergency service stations respectively, said selector switch being connected to said emergency service stations to select the particular emergency station to receive said recorded call and message via said pair of amplifiers, a monitor loud-speaker connected to said first amplifier at the receiver station, a drive motor operatively connected to drive said tape in the direction of its length, and relay means for simultaneously and automatically lighting said lamp and starting said motor upon receipt of said call at the telephone receiver.

7. An emergency call tracing and reproducing system, comprising a receiver station, telephone central station, a plurality of emergency service stations, said receiver station having a telephone receiver connected to said central station via a telephone line, a dual track tape recording and reproducing device located at the receiver station, one of said tracks having a recorder head connected with said telephone receiver to record in full a call received by said telephone receiver, a signal lamp located at the central station and operatively connected to the receiver station to be lit when said call is received at the receiver station, a microphone at the central station connected via a first amplifier and another telephone line to another recorder head for recording a message on the other of the dual tracks, a pair of reproducing heads spaced longitudinally along the tape from the recorder heads to pick up signals from the tracks respectively and transmit them to a pair of amplifiers, a selector switch connected to each of the amplifiers, and a plurality of loud-speakers located at said plurality of emergency service stations, respectively, said selector switch being connected to said emergency service station to select the particular emergency station to receive said recorded call and message via said pair of amplifiers.

References Cited in the file of this patent

UNITED STATES PATENTS

| | | |
|---|---|---|
| 2,131,568 | Peterson | Sept. 27, 1938 |
| 2,431,797 | Ffolliott | Dec. 2, 1947 |
| 2,539,139 | Jordanoff et al. | Jan. 23, 1951 |
| 2,568,342 | Koehler et al. | Sept. 18, 1951 |
| 2,633,055 | Badmaieff | Mar. 31, 1953 |
| 2,733,301 | Bradbury | Jan. 31, 1956 |
| 2,816,958 | Wadsworth | Dec. 17, 1957 |